No. 710,912. Patented Oct. 7, 1902.
A. J. FARMER.
FISH SPLITTING AND CLEANING MACHINE.
(Application filed Nov. 4, 1901.)
(No Model.) 3 Sheets—Sheet 1.

Witnesses, Inventor,
Albert J. Farmer

No. 710,912. Patented Oct. 7, 1902.
A. J. FARMER.
FISH SPLITTING AND CLEANING MACHINE.
(Application filed Nov. 4, 1901.)
(No Model.) 3 Sheets—Sheet 2.
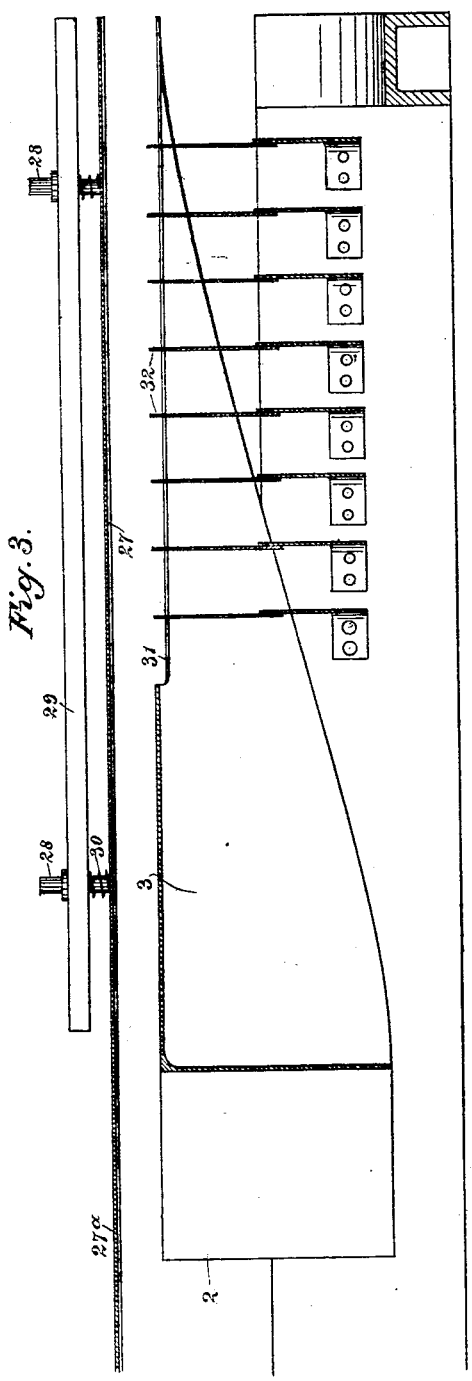
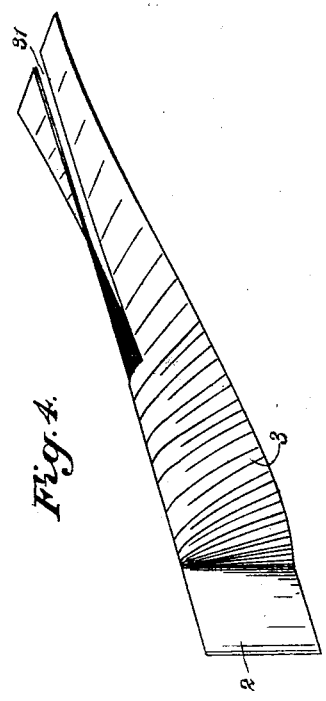
Witnesses,
Inventor,
Albert J. Farmer
By Dewey Strong & Co.
Att'ys

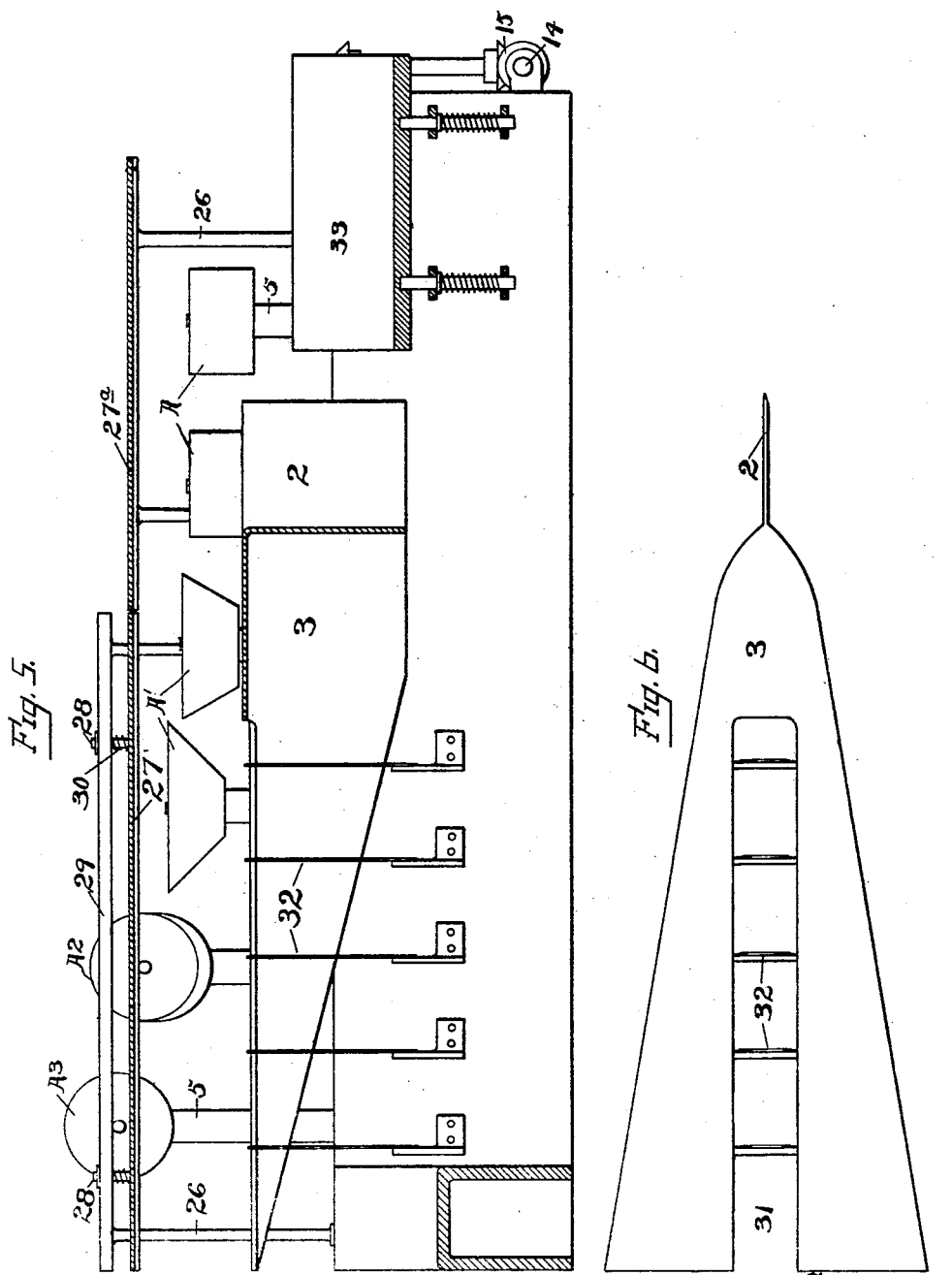

UNITED STATES PATENT OFFICE.

ALBERT J. FARMER, OF SAN FRANCISCO, CALIFORNIA, ASSIGNOR OF TWO-THIRDS TO JOSEPH P. HALLER AND C. P. HALE, OF SAN FRANCISCO, CALIFORNIA.

FISH SPLITTING AND CLEANING MACHINE.

SPECIFICATION forming part of Letters Patent No. 710,912, dated October 7, 1902.

Application filed November 4, 1901. Serial No. 81,015. (No model.)

*To all whom it may concern:*

Be it known that I, ALBERT J. FARMER, a citizen of the United States, residing in the city and county of San Francisco, State of California, have invented an Improvement in Fish Splitting and Cleaning Machines; and I hereby declare the following to be a full, clear, and exact description of the same.

My invention relates to a machine which is designed to split and clean fish.

It consists of a series of rollers having teeth or spikes adapted to engage and carry the fish, means by which said rollers are adjustable for fish of different sizes, mountings for the rollers by which the first rollers encountered by the entering fish present approximately vertical gripping-surfaces, and these are gradually inclined until at the discharge the surfaces of the rollers are presented downwardly, so as to flatten out the fish for drying or similar purposes. Intermediate between the rollers is a splitting and gradually-spreading device by which the fish is opened out in unison with the gradually-changing faces of the pressure-rollers and mechanism in conjunction therewith by which the entrails are cleaned out during the progress of the fish through the apparatus.

My invention also comprises details of construction, which will be more fully explained by reference to the accompanying drawings, in which—

Figure 1:
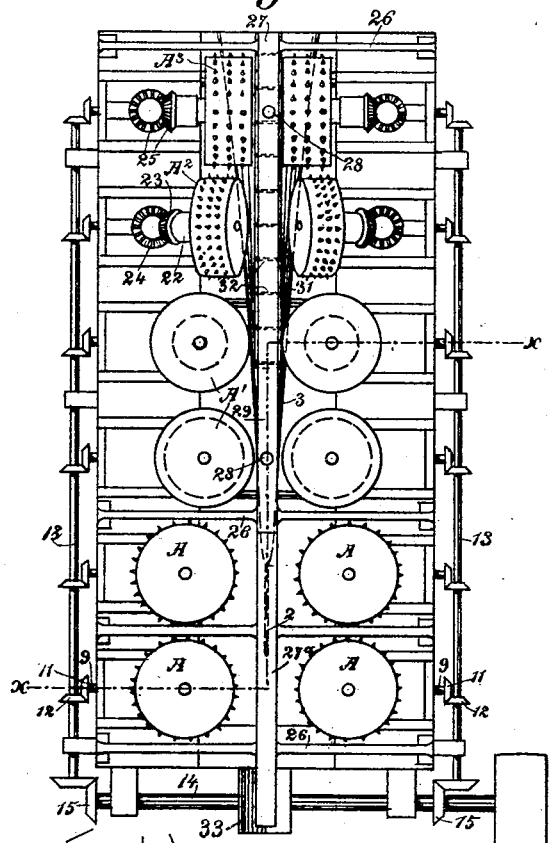
Figure 2:
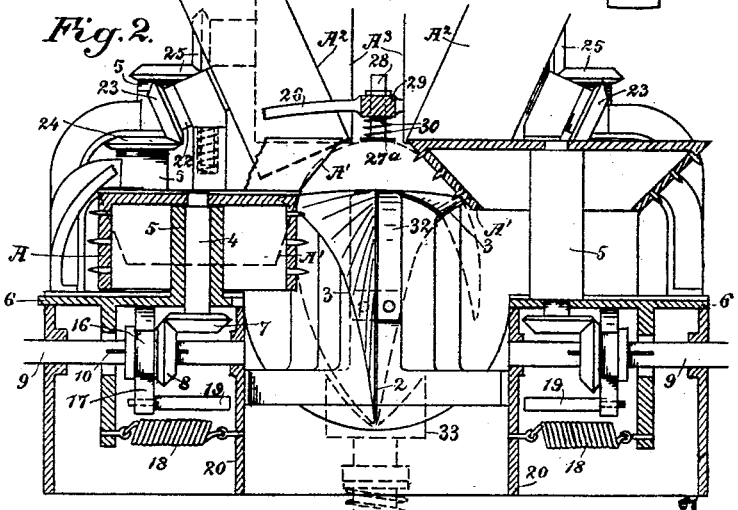

Figure 1 is a plan view of the apparatus. Fig. 2 is a vertical transverse section, taken on lines $x\ x$ of Fig. 1. Fig. 3 is a longitudinal central section of part of the apparatus, showing the splitting, spreading, and cleaning devices. Fig. 4 is a perspective view of the splitter and spreader. Fig. 5 is an enlarged longitudinal sectional view of the machine. Fig. 6 is a plan view of the knife and spreader.

The apparatus comprises a series of rollers A, having teeth or spurs upon their peripheries adapted to engage the fish, which is delivered into the apparatus near one end. The first of these rollers have essentially vertical journals about which they revolve, and while passing through between the first one or two pairs of rollers the fish is carried over the splitting-knife 2 and the separated sides commence to pass over the gradually-diverging surfaces of the spreader 3, which extends behind the central and vertically-disposed cutter 2 and gradually diverge, as shown in Fig. 4, until at the rear end it is approximately flat, so that the fish passing over this spreader will have the sides gradually opened out until it is approximately flat, this being especially desirable in preparing such fish as codfish, which are to be flattened out for the purpose of drying. The surfaces of the rollers A', which coincide with the gradually-separating sides of the spreader 3, are correspondingly beveled, or the rollers are turned so that they will present spiked faces to press against the outer surface of the gradually-opening sides of the fish and to hold it firmly against the spreader over which it is being moved. When the inclination of these surfaces becomes greater than forty-five degrees, it is preferable to change the position of the shafts upon which the rollers are carried, so that the rollers toward the end will stand in the position shown at $A^2$ and the final ones may have their shafts approximately horizontal, so that the rollers will stand in the position shown at $A^3$. Thus the surfaces of the rollers which engage and carry the fish will gradually change their angle of presentation from approximately vertical, as in the rollers A, to an approximately horizontal one in the rollers $A^3$, thus conforming to the gradual change in shape of the spreader. In order to drive these rollers in unison and at the same time to allow them sufficient freedom to adjust themselves to large or small fish passing between them, I have shown the first rollers A and A' as mounted upon vertical journal-shafts 4, to which the rollers are keyed or otherwise secured, so that motion may be transmitted through them. In the present construction the rollers are shown as hollow and the upper ends of the rollers are fixed to the top of the shaft 4. The shaft 4 is guided in a sleeve 5, which is formed with or carried by a horizontally-slidable plate or carrier 6. The lower end of the shaft 4 has upon it a bevel-gear 7, which engages with a corresponding bevel-gear 8, and this latter gear is slidable upon a horizontal journal-shaft 9, but is so connected as to be driven by the shaft whatever change in the position of the gear takes place by a feather and keyway, as at 10. The outer ends of the shafts 9 carry bevel-gears 11, and these mesh with corresponding gears 12 upon horizontal journal-shafts 13, which extend along the sides of the machine. One shaft transmits power to drive the rollers upon one side and the other those upon the other side. Power to drive these shafts 13 in unison is transmitted from the main shaft 14 by bevel-gears, as at 15, so that the whole series of rollers is driven in unison. The gears 8, slidable upon the feathers 10, have annular grooves around the hubs, as at 16, and these are engaged by clutch-shaped forks 17, extending down on each side of the grooved hubs and having their upper ends secured to the slidable carrier 6, so that whenever a fish of large dimensions passes between the rollers A these rollers will be pressed outwardly, and as they are mounted upon the carrier 6 the latter must move in unison with them, and by means of the clutch-fork 17 the gears 8 are correspondingly moved in unison with the gear 7, thus always remaining in mesh. Whenever the fish has passed the carriers, the rollers and other parts are returned to their normal position of least distance between the rollers A by means of springs, as shown at 18. The distance to which they can be returned is limited by stop-bars 19, carried by some portion of the moving parts and adapted to engage a fixed portion of the frame, such as 20, to limit the inward movement of the rollers. As the faces of these rollers are required to diverge to correspond with the form of the spreader 3, it will be seen that up to about forty-five degrees the faces of the rollers may be beveled, as shown at A' in Fig. 2, with the same vertical disposition of the shafts; but when the angle becomes more nearly vertical than forty-five degrees it will be necessary to change the angles of the rollers themselves. In such case the rollers, as at $A^2$, are mounted upon shafts journaled at the proper angle, as shown at 22, and these shafts carry bevel-gears 23, which are engaged by bevel-gears 24 upon vertically-disposed shafts, which are driven by connection with the counter-shaft 13 by means of gears 11 and 12, as before described. When the rollers have arrived at the position shown at $A^3$, their shafts are essentially horizontal, and they are then driven by bevel-gears meshing at right angles, as shown at 25. The main frame of the apparatus has suitable yokes or supports for the various parts in their change of position, as shown at 26.

Above the splitting and spreading device is a plate 27, beneath which the upper portion of the fish passes and with which it contacts, so that the interior part will be held down in contact with the spreader. This plate 27 has vertical posts or stems 28 passing through a fixed rigid bar 29, which forms a part of or is supported from the main frame, and by means of springs, as at 30, interposed between the movable plate 27 and the fixed bar 29, the plate is yieldingly held down, but is allowed to rise when the thickness of the passing fish makes it necessary.

$27^a$ is a fixed plate in line with the plate 27 and extending toward the front or entering end of the machine. At a sufficient distance beneath this plate to act as a support for the approaching fish before it reaches the grips of the feed-rollers is a spring-supported plate 33, and when a fish is presented it is first passed over this yielding plate 33 and beneath the rigid plate $27^a$. This allows fish of any size to pass to the knife, and the upper plate holds all fish so that the proper cut is made. After leaving the knife and while passing over the spreader the latter supports the fish from below and the plate 27 yields from above as may be necessary. From the termination of the plate or support 33 to a point where the knife is fixed the fish is unsupported except by the grip of the rollers or carriers by which it is transferred at this point. In this manner by the automatic adjustment of the rollers and the pressure-plates 27 and 33 and the gradually-changing angles of the spreader and the corresponding rollers the fish will be carried through the apparatus, split, opened out to any desired degree, to the extent of making it perfectly flat at the end. During this operation it is desirable to cleanse the interior of the entrails and soft portions. This is effected by separating the spreader into two parts, leaving an open channel at the rear portion, as shown at 31.

32 represents elastic blades or scrapers of any suitable character projecting up through this open portion of the spreader in such a manner that they will enter the open cavity of the fish, and as the fish passes over these scrapers the entrails and soft portions will be entirely scraped out by their action and discharged downwardly.

It will be seen that in this apparatus the fish is presented belly downward, and after being seized by the rollers or carriers it is supported by their grip upon the sides without any support or obstruction beneath when the fish arrives at the knife, and when it is split there is a free and unobstructed space for the escape of the entrails.

Having thus described my invention, what I claim, and desire to secure by Letters Patent, is—

1. The combination in a fish-cleaning apparatus of revoluble rollers opposing each other in pairs and having spurs projecting from their periphery, means for positively driving the rollers, a splitting-knife and spreader intermediate between said rollers, and mechanism by which the rollers may be separated or caused to approach each other.

2. The combination in a fish-cleaning apparatus of a centrally-disposed vertical splitting-knife, a spreader consisting of sides gradually diverging from the knife to an approximately horizontal position, rollers having spurs upon their peripheries, journaled upon each side of the knife and spreader and presenting their peripheries at angles changing gradually from the vertical to the horizontal to correspond with the form of the spreader, and mechanism by which said rollers are revolved in unison.

3. The combination in a fish-cleaning apparatus of a centrally-disposed vertical knife, a spreader consisting of sides gradually diverging from a vertical position at the knife to an approximately horizontal position at the rear, rollers journaled upon each side having the angles of their peripheries corresponding with the changing angles of the spreader and provided with spurs adapted to engage and transmit the fish over the cutter and spreader, means for transmitting power to revolve the rollers in unison, and means causing the rollers to approach or separate transversely.

4. The combination in a fish-cleaning machine of a vertically-disposed cutter, a spreader, rollers having their peripheries provided with spurs adapted to engage the sides of the fish, shafts upon which the rollers are carried, horizontal shafts and bevel-gears through which motion is transmitted from the horizontal shafts to the roller-shafts, feathers upon which the gears of the horizontal shafts are movable, lateral slidable carriers upon which the roller-shafts are carried, and clutch-forks upon the carriers engaging the gears of the horizontal shafts and moving them in unison with the movements of the rollers and their gears.

5. The combination in a fish-cleaning apparatus of a vertically-disposed stationary cutter, a gradually-diverging spreader extending rearwardly therefrom, rollers journaled upon opposite sides of the cutter and spreader having their peripheries conforming to the cutter and to the surface of the spreader and provided with spurs by which the fish is advanced, transversely-movable carriers upon which the roller-shafts are carried, horizontal shafts and bevel-gears through which motion is transmitted to the rollers from main and counter shafts, means for sliding the transmitting-gears and maintaining them in mesh with those of the roller-shafts, and springs by which the carriers and rollers are automatically returned to their normal position after the passing of the fish.

6. The combination in a fish-cleaning machine of a vertical splitting-knife and spreaders diverging rearwardly, rollers having spurs upon their periphery and conforming to the changing positions of the fish, said rollers being mounted upon horizontally-slidable carriers and separable to conform to different sizes of fish, springs by which the rollers are returned to their normal position after the fish has passed, and stops limiting the return movement of the rollers.

7. The combination in a fish-cleaning apparatus of a fixed vertical splitting-knife, spreaders diverging upon each side of the knife rearwardly having a slot or opening in the rearmost portion, fixed scrapers extending upwardly through said slot, and rollers adjustably journaled upon opposite sides of the knife and spreader having peripheral spurs adapted to engage and transmit the fish over the cutter and spreaders.

8. The combination in a fish-cleaning apparatus of a fixed vertical splitting-knife, spreaders diverging upon each side of the knife rearwardly and having an open centrally-disposed slot, scrapers projecting upwardly through the slot, a pressure-plate located above, and between which and the spreader the fish passes, and rollers adjustably journaled with relation to the knife and spreader and adapted to engage and transmit the fish over the knife and spreader.

9. The combination in a fish-cleaning apparatus of a fixed vertical splitting-knife, spreaders diverging upon each side of the knife rearwardly and having an open centrally-disposed slot, scrapers projecting through said slot, a yielding spring-pressed plate located above and between which and the spreader the fish passes, and rollers adjustably journaled with relation to the knife and spreader, and adapted to engage and transmit the fish over the knife and spreader.

10. In a fish-cleaning apparatus, revoluble vertically-journaled feed-rollers opposing each other in pairs, means by which the fish is suspended between the rollers without other support, means for positively driving the rollers, and means by which the rollers are adjusted to and from each other for different-sized fish.

11. In a fish-dressing machine the combination of vertically-journaled spur-armed feed-rollers opposing each other in pairs, means for positively driving the rollers, means whereby the rollers are adjustable, and a splitting-knife and spreader to which the fish is delivered.

In witness whereof I have hereunto set my hand.

ALBERT J. FARMER.

Witnesses:
S. H. NOURSE,
CHAS. E. TOWNSEND.